Patented July 28, 1953

2,647,150

UNITED STATES PATENT OFFICE 2,647,150

SEPARATION OF ALCOHOLS FROM MERCAPTANS

Robert J. Askevold, Skokie, Ill., assignor to The Pure Oil Company, Chicago, Ill., a corporation of Ohio No Drawing. Application March 10, 1948, Serial No. 14,143

4 Claims. (Cl. 260—609)

This invention relates to a method of separating alcohols and mercaptans and in particular involves a method of separating aliphatic alcohols and mercaptans by a process including an adsorption step.

There are numerous industrial processes in which mercaptans and alcohols will occur together or be mixed together, thereby creating a need for a process for the separation thereof. For example, in the refining of petroleum hydrocarbons frequently alcoholic alkali solutions are used to extract mercaptans. Subsequent refinement of the sweetening solution may call for separation of sulfur compounds. Thus, at some stage alcohol and mercaptan will occur together, and if they are to be of any use, their separation must be accomplished.

Likewise, in the synthesis of mercaptans, it is quite possible to obtain alcohols as by-products, thus necessitating the recovery of the individual components. Also end products in the synthesis of mercaptans include mixtures of mercaptan and hydrocarbon which are extracted with alcohols, thereby creating a need for the separation of the two.

Accordingly, it is an object of the instant invention to provide a method for obtaining a separation of alcohols and mercaptans.

It is a second object of the invention to provide an adsorption process for the separation and concentration of mercaptans occurring in admixture with alcohols.

It is a further object of the invention to provide a process for the concentration of mercaptans occurring in the alcohol solution by means of a simple adsorption operation which can be carried out as a relatively simple extra step in any process wherein the alcohol-mercaptan mixture is likely to occur.

Other objects and advantages of the invention will in part be obvious and in part appear hereinafter.

I have found that certain alcohols when occurring in admixture with certain mercaptans can be stripped therefrom by an adsorption process which includes the several steps of percolating the alcohol-mercaptan mixture over a granulated or powdered active adsorbent at about ambient temperature, passing the purified mercaptan to such subsequent recovery or additional process stages as may be desired, regenerating the adsorbent and recovering the adsorbed alcohol. More specifically, aliphatic alcohols containing up to about 10 carbon atoms can be separated from mercaptans containing up to about 14 carbon atoms by percolating the mixture of alcohol and mercaptan through a granular activated adsorbent, such as silica gel, activated alumina, bauxite, montmorillonite type clays, such as fuller's earth and bentonite, magnesia and activated charcoal or carbon. Thus, the invention contemplates the separation of such mercaptans as methyl, ethyl, propyl, butyl, heptyl, etc., mercaptan, from such alcohols as methyl, ethyl, propyl, butyl, and heavier alcohols having straight or branched chains which occur in admixture with the mercaptan or mercaptans it is desired to recover. In general, the type of mixture to be treated would be one containing several mercaptans of intermediate molecular weight, both straight and branched chain, such as would occur in a hydrocarbon fraction which is sweetened with a liquid sweetening agent. The alcohol occurring therewith would probably be methyl or ethyl alcohol, because these are the alcohols most commonly used as solvents in alkali washing and sweetening operations. Where heavier mercaptans are mixed with the alcohols mentioned, it would probably be as a result of a manufacturing process which required the extraction with alcohol of the mercaptan produced in a synthesis from that collected as product. Similarly, processes which involve the synthesis of mercaptans would be likely to develop at some stage mixtures of alcohol and mercaptan having relatively close molecular weights and similar structures, which mixtures the process is most effective in separating.

Suitable adsorbents for the process are those capable of adsorbing at least about 10 per cent of their weight of water at 77° F. when in equilibrium with water vapor at a partial pressure of 22 millimeters of mercury. Thus, suitable adsorbents, as determined by water adsorptivity, are:

| | |
|---|---|
| Silica gel | 15% |
| Activated charcoal | Over 20% |
| Activated alumina | 20% and over |
| Bauxite | 15% |

Boneblack and diatomaceous earth, which show no adsorptivity of water under the specified conditions, would not be suitable.

The practice of the process of extracting mercaptan from alcohol mixtures comprises arranging a column or bed of adsorbent having a diameter and length commensurate with obtaining a useful flow of the purified mercaptan for application in subsequent processing steps and percolating the mercaptan-alcohol mixture through the adsorbent.

A typical experimental laboratory size for the convenient separation of small quantities of alcohol-mercaptan mixture consists of a column having an upper section about 20 inches long and about ⅞ inch in diameter and a lower section about 28 inches long and ⅜ inch in diameter, packed with the adsorbent silica gel ground to a mesh of about 100 to 325. The amount of adsorbent needed to pack such a column is about 165 grams. For large scale or industrial operation, a convenient apparatus of appropriate dimensions commensurate with the need for production at a determined rate is readily made.

When steady state operation is needed to furnish a continuous supply of mercaptans in substantially pure form, a group of columns can be arranged in parallel to provide a flow of product while regeneration of a spent column is being carried out. Upon exhaustion of the adsorptive power of a given column or upon reduction of adsorbent power to an uneconomical low level, the material can be regenerated by heating to 100° to 300° C., which operation is preferably carried out under reduced pressure or with a stream of inert gas. Because it is not only desirable but necessary for the economy of the process to recover the adsorbent as well as the material adsorbed, provision is made therefor, and the recovered alcohol is useful for recycling in the sweetening operations or for other processes.

When it is desirable or necessary to prepare useful concentrations of mercaptans which are initially contaminated with alcohols, the process is carried out by percolating the mixture over a preferential adsorbent such as silica gel and the effluent product thus concentrated is subjected a second time to silica gel adsorption. The adsorbing agent may be extracted with an alcohol lighter than the adsorbed alcohol to regenerate it, or washed with water to remove the alcohol. Effective regeneration can also be accomplished by steaming or heating the spent adsorbent sufficiently to remove the adsorbed alcohol.

The following examples will illustrate the practice of the invention and its capacity for stripping mercaptans from alcohol admixed therewith.

*Example I.*—In a laboratory column having an upper section 20 inches long and 0.88 inch in diameter and a lower section 28 inches long and 0.38 inch in diameter, packed with 165 grams of a high quality 100 to 325 mesh silica gel, 50 milliliters of a mixture of 50 parts by volume of ethyl alcohol and 50 parts by volume of ethyl mercaptan was purified at 40° to 45° F. by percolation through the column using a driving force of nitrogen pressure to induce flow of about 25 to 30 milliliters per hour. Ethyl alcohol was added after the entire charge had entered and followed the charge down the column. Upon recovery of fractions of the mixture after a single pass through the column, the mercaptan content showed a distinct concentration in the early fractions. The results are tabulated below:

Table I

| Fraction | Volume, ml. | Percent Mercaptan | Percent Mercaptan Sulfur |
|---|---|---|---|
| 1 | 5 | 90 | 45.4 |
| 2 | 5 | 93 | 47.3 |
| 3 | 5 | 91 | 46.1 |
| 4 | 5 | 89 | 45.0 |
| 5 | 5 | 87 | 43.9 |
| 6 | 5 | 3 | 1.3 |
| 7 | 5 | <.3 | 0.12 |
| 8 | 5 | <.2 | 0.06 |
| 9 | 25 | <.1 | 0.02 |

The results show that the first 25 milliliters of effluent contained about 90 per cent, or 22.5 milliliters, of the starting 25 milliliters of ethyl mercaptan.

*Example II.*—Fifty milliliters of a mixture of 50 parts by volume of decyl alcohol and 50 parts by volume of ethyl mercaptan was passed through a column having an upper section 20 inches long and 0.88 inch in diameter, and a lower section 28 inches long and 0.38 inch in diameter, containing 165 grams of silica gel at a rate of 25 to 30 milliliters per hour using a driving force of nitrogen at ambient temperature (50° to 60° F.). Ethyl alcohol was added after the entire charge had entered and followed the charge down the column. Progressive sampling of the effluent from the column gave the following results:

Table II

| Fraction | Volume, ml. | Percent Mercaptan | Percent Mercaptan Sulfur |
|---|---|---|---|
| 1 | 5 | 80 | 40.4 |
| 2 | 5 | 65 | 33.0 |
| 3 | 5 | 41 | 20.9 |
| 4 | 5 | 33 | 16.7 |
| 5 | 5 | 29 | 14.6 |
| 6 | 5 | 28 | 14.2 |
| 7 | 5 | 24 | 11.9 |
| 8 | 5 | 21 | 10.5 |
| 9 | 25 | 5 | 2.5 |

Though the separation of alcohol and mercaptan was not as sharp as that shown in Example I, where alcohol and mercaptan were very close together in structure and molecular weight, a useful increased concentration of mercaptan is obtained in the effluent.

*Example III.*—Following a procedure like that outlined in Example II, 50 milliliters of a mixture of ethyl alcohol and tetradecyl mercaptan, containing 50 parts of each by volume, was passed through a column containing 165 grams of 100 to 325 mesh silica gel at a rate of about 25 to 30 milliliters per hour. A running analysis of the effluent gave the following results:

Table III

| Fraction | Volume, ml. | Percent Mercaptan | Percent Mercaptan Sulfur |
|---|---|---|---|
| 1 | 5 | 89 | 12.3 |
| 2 | 5 | 99 | 13.7 |
| 3 | 5 | 30 | 4.2 |
| 4 | 5 | 17 | 2.4 |
| 5 | 5 | 17 | 2.4 |
| 6 | 5 | 26 | 3.6 |
| 7 | 5 | 26 | 3.6 |
| 8 | 5 | 24 | 3.3 |
| 9 | 25 | 20 | 2.7 |

Again, though the separation of alcohol and mercaptan was not as sharp as that shown in Example I, where alcohol and mercaptan were very close together in structure and molecular weight, a useful increased concentration of mercaptan is obtained in the effluent.

Since different embodiments of the process could be carried out without departing from the scope of the invention as described, it is intended that all matter contained in the description shall be interpreted as illustrative and not in a limiting sense.

What is claimed is:

1. The method of recovering fractions substantially richer in aliphatic alcohol and fractions substantially richer in aliphatic mercaptan from a mixture of same, comprising percolating said mixture at ambient temperature through an amount of a granular adsorbent sufficient to adsorb a substantial portion of the alcohol from the mixture, continuing said percolation for a time sufficient to saturate said adsorbent with said mixture and recovering effluent fractions substantially richer in aliphatic mercaptan until the aliphatic alcohol content thereof shows a substantial increase, thereafter discontinuing said percolation, separating said spent adsorbent from said mixture, eluting said adsorbent with a liquid selected from the group consisting of an alcohol of lower molecular weight than the aliphatic alcohol in said mixture and water, to thereby obtain fractions substantially richer in aliphatic alcohol than said mixture.

2. The method in accordance with claim 1 in which said adsorbent is selected from the group consisting of silica gel, activated carbon, and activated alumina.

3. The method in accordance with claim 1 in which the aliphatic alcohol and aliphatic mercaptan have substantially the same number of carbon atoms per molecule.

4. The method in accordance with claim 1 in which the aliphatic alcohol is ethyl alcohol, the aliphatic mercaptan is ethyl mercaptan, and the adsorbent is silica gel.

ROBERT J. ASKEVOLD.

References Cited in the file of this patent

UNITED STATES PATENTS

| Number | Name | Date |
|---|---|---|
| 1,537,260 | Patrick | May 12, 1925 |
| 1,995,612 | Huffman et al. | Mar. 26, 1935 |
| 2,309,652 | Leum et al. | Feb. 2, 1943 |
| 2,309,654 | Leum et al. | Feb. 2, 1943 |
| 2,441,572 | Hirschler et al. | May 18, 1948 |
| 2,449,402 | Lipkin | Sept. 14, 1948 |
| 2,458,819 | Yowell et al. | Jan. 11, 1949 |
| 2,488,479 | Schindler | Nov. 15, 1949 |

OTHER REFERENCES

Rao et al., Proc. Ind. Acad. Sci., vol. IVA (1936), pages 562–569.

Smyth, "Dielectric Constant and Molecular Structure" (A. C. S. Monograph No. 55), page 193, Pat. by Chemical Catalog Co., New York, N. Y., 1931.